Oct. 24, 1961     H. R. HEGGEN     3,005,941
STEPPER MOTOR CONTROL
Filed April 15, 1960
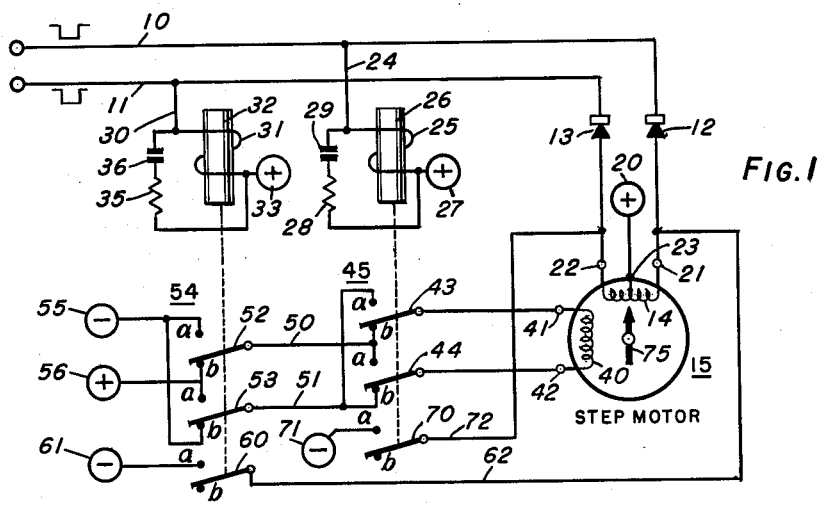
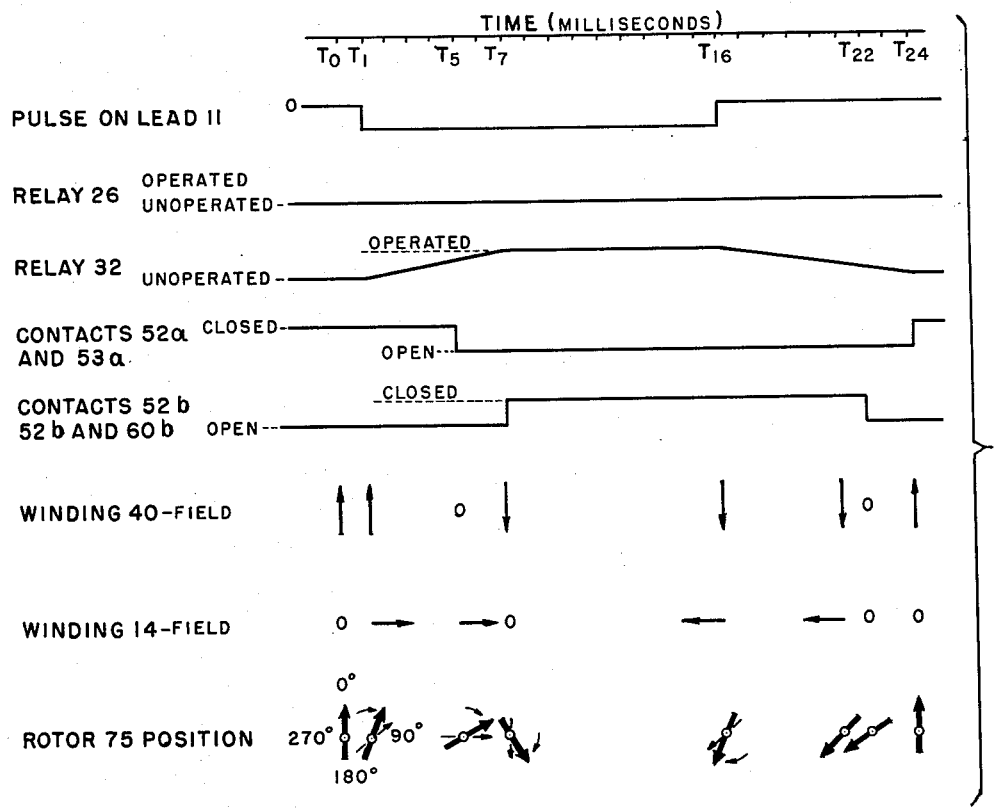

sheet 1

United States Patent Office 3,005,941
Patented Oct. 24, 1961

3,005,941
STEPPER MOTOR CONTROL
Henry R. Heggen, Sunland, Calif., assignor to The Bendix Corporation, a corporation of Delaware
Filed Apr. 15, 1960, Ser. No. 22,455
11 Claims. (Cl. 318—443)

This invention relates to stepper motor mechanisms and more particularly to control circuitry for stepper motors.

Relay circuitry for controlling the advance of miniature motors in response to pulse input has been proposed in prior art. However, the number of electrical and electrical mechanical elements required in prior art circuits have been so great as to limit the life of the apparatus. As an example in one specific application, the apparatus must respond to 1800 pulses per minute for several hours. Representative prior art control circuits require the joint operation of two or more relays for each revolution so that the life of the apparatus is limited to the life of the relays.

With the state of the prior art in mind, it is a general object of this invention to improve the life of pulse-actuated or stepper motor systems.

A more specific object is to provide a stepper motor control circuit employing a small number of components.

Another object is to provide dual directional control of a stepper motor responding at a rate of one full revolution per pulse.

Briefly, the invention comprises a motor having a permanent magnet rotor, one stator winding associated with a pair of input leads over which control pulses for the motor are received, and a second stator winding under the control of a pair of relays energized by pulses over the respective input leads.

One feature of the invention is an arrangement for applying control pulses directly to one stator winding of the motor and to a single relay which controls a power input to the second stator winding.

Another feature is the neutralizing of the field produced by the incoming pulses in the one stator winding by a local source under the control of the relays to produce a rotor-advancing field.

Another feature is a connection of the stator windings to provide a rotating impulse for the rotor during transient conditions of the control relays.

These and other objects and features of the invention may be more clearly understood from the following detailed description with reference to the drawing, in which:

FIG. 1 is an electrical schematic of an embodiment of the invention; and

FIG. 2 is a diagram illustrating the operation of the invention.

Referring now to FIG. 1, a pair of input leads 10 and 11 are connected through respective isolating diodes 12 and 13 to the opposite ends 21 and 22 of a first stator winding 14 of a stepper motor generally designated 15. The diodes 12 and 13 insure that only pulses of proper polarity reach the control circuit and further insure that input pulses on one input lead do not flow through the other input lead. A center tap 23 of the winding 14 is connected to a positive voltage source 20. A branch conductor 24 connects the conductor 10 to one end of a winding 25 of a relay 26, the opposite side of which winding is connected to a positive voltage source 27. A branch conductor 30 connects conductor 11 to one end of the winding 31 of a relay 32, the opposite end of which winding is connected to a positive voltage supply 33. Winding 25 has a resistor 28 and a capacitor 29 connected in series thereacross to provide a slow release. Winding 31 has a similar slow release network thereacross including resistor 35 and capacitor 36.

A second stator winding 40 of the motor 15 having terminals 41 and 42 is connected to a pair of armatures 43 and 44 of relay 26. These armatures with their associated fixed contacts constitute a reversing switch 45 connected through conductors 50 and 51 to respective armatures 52 and 53 of relay 32, which with their associated fixed contacts constitute a second reversing switch 54. The fixed contacts 52a and 53b of reversing switch 54 are connected to a negative voltage supply 55, and the fixed contacts 52b and 53a are connected to a positive voltage supply 56. The relay 32 includes an additional armature 60 adapted to connect a negative voltage supply 61 via a lead 62 to the terminal 21 of the stator winding 14. The relay 26 includes an additional armature 70 adapted to connect a negative voltage source 71 via a conductor 72 to the terminal 22 of stator winding 14.

The stepper motor 15 employs a permanent magnet rotor represented by arrow 75. The rotor 75 is caused to "step" increments of 45° or 90° by appropriate energization of the stator windings 14 and 40 of the motor 15, hence, the name "stepper motor."

In FIG. 1 of the drawing, the pole pieces associated with the windings are not shown. For purposes of understanding this invention, it may be assumed that the rotor 75 as shown in its 0° position, resulting from the flow of current from terminal 41 to terminal 42 of winding 40 producing a north pole at the lower end of winding 40 and a south pole at the upper or terminal end 41 of winding 40. The rotor 75, which in actuality is a permanent magnet, has its north-seeking pole at the arrowhead end. The winding 14 normally has no current flowing through either half, so produces no magnetic field in the absence of a pulse on either input conductor 10 or 11. The movement of the rotor 75 may be visualized considering the production of a magnetic north at the terminal 22 end of winding 14 by pulse current on lead 11 and the reversal of the magnetic poles at winding 40 upon the operation of the relay 32.

The operation of the system described may be understood by reference to FIG. 2, which shows the different conditions of the contacts of the relays 26 and 32 and the changes in the fluxes generated by the windings 14 and 40, as well as the different rotor positions, during one cycle of operation. In FIG. 2, the dashed arrow indicates the position toward which the combined fields tend to move the rotor 75, while the solid arrow shows the actual rotor position and direction of rotation.

In the static condition prior to application of an input pulse, current flows from the positive voltage source 56 through contact 52b of reversing switch 54, conductor 50, contact 43b of reversing switch 45, to terminal 41 of the winding 40, and thence from terminal 42 to the negative supply 55 via the contact 44b of reversing switch 45, conductor 51, and contact 53b of switch 54. Current flowing in the direction described (from terminal 41 to terminal 42) through the winding 40 produces a magnetic field in direction represented by the first vertical arrow associated with the "Winding 40 Field" flux designation in FIG. 2 at time $T_0$. The winding 14 has no current flowing through it; consequently no flux is generated as represented by the zero at the time $T_0$. The rotor 75 assumes the vertical position parallel with the magnetic field of winding 40. This locks the rotor 75 in the 0° position.

When a negative voltage pulse is applied to lead 11 beginning at time $T_1$, the relay 26 associated with lead 10 remains de-energized, while the relay 32 is energized and after a time lapse determined by its normal operating speed will shift its armatures. The negative pulse on lead 11 is simultaneously applied through the diode 13 to terminal 22 of winding 14, producing a current through the left half of the winding and the terminal 23 to the positive voltage supply 20. The current passing through this portion of winding 14 generates a field at right angles to the field of the winding 40, which latter winding remains energized during this initial period of the pulse until the contacts 52a and 53a of relay 32 open. The field buildup in winding 14 affects the rotor 75 directly, while the field in the winding of the relays 32 and 26 only acts to transfer armatures after the field reaches a predetermined level, and then a significant time is required for either armature to operate. Consequently, the same pulse applied to both the stator winding 14 and either relay affects the rotor 75 first through the field produced in winding 14 and subsequently upon the reversal of current through winding 40 by transfer of the armature contacts. At the end of each pulse, the collapse of current in winding 14 and its field precedes the change in fields controlled by the relays 32 and 26, owing primarily to the delay network connected across each relay winding 25 and 31. The resultant of the fields established by windings 14 and 40 is at an angle between 0° and 90°, for example 45°, and the rotor 75 which preferably has low inertia thereupon rapidly assumes the intermediate position, as shown in FIG. 2 at time $T_1$.

After a period of time, for example, four milliseconds, at time $T_5$, the contacts 52b and 53b of the relay 54 open, thereby terminating the flow of current into winding 40, and the field of winding 40 disappears, as indicated by the zero opposite. The current continues to flow between terminals 22 and 23 of winding 14, and the total field is in the 90° direction. The rotor 75 under the influence of this field steps to the 90° position. After the armature transit time of two milliseconds, at time $T_7$, the contacts 52a, 53a of the transfer switch 54 and the contact 60a of the auxiliary switch 60 close. The closure of contacts 52a and 53a causes the flow of current through winding 40 in the opposite direction, to wit, from terminal 42 to 41, thereby inducing a field in the opposite direction from the standby field, i.e., 180°.

The closure of contact 60a causes current to flow from the voltage source 20 through half of winding 14 to terminal 21, conductor 62, and the switch 60 to the negative voltage supply 61. This current, when equal in magnitude and opposite in direction with respect to the current between the terminals 22 and 23 of winding 14 produced by the pulse from lead 11, results in a cancellation of the field of winding 14. The only field affecting the rotor at this instant is the 180° oriented field of winding 40. The rotor 75 thereupon assumes a position of 180°.

After time $T_7$, the rotor will stay at the 180° position as long as there is an input signal on the conductor 11. At the end of the pulse, shown as time $T_{16}$, the relay 32 is no longer energized from the line 11, but does not immediately release. However, upon the disappearance of the pulse on the lead 11, the left half of the stator winding 14 is de-energized. Current continues to flow from the source 20 through the right half of winding 14 to terminal 21, and over the conductor 62 and closed contact 60a of the relay 32 to the negative source 61. This results in the establishment of a field by the winding 14 in a 270° direction, as shown in FIG. 2. Current continues to flow through winding 40 because the contacts of the relay 32 still remain in their operated condition. The resultant of the fields developed by winding 40 and 14 is in the 225° direction, and the rotor assumes that position, turning from 180°. The 225° field resultant remains during the transfer time as the relay 32 is de-energized. As previously indicated, the release of the relay 32 is delayed by the network comprising the series capacitor 36 and resistor 35 connected across the winding 31. The delay network slows the release of the relay 31, for example, six milliseconds after the pulse disappears from conductor 11 as compared to a normal fall-out time of three milliseconds. At time $T_{22}$, contacts 52a, 53a and 60a all open. The opening of contacts 52a and 53a terminate the current flow in winding 40, and the opening of contact 60a terminates the flow of current through the right half of winding 14. For that brief instant, no magnetic field acts upon the rotor momentum. After a period of two milliseconds, during which the transfer from the a to the b contacts of the relay 32 takes place, the flow of current through winding 40 is re-established in the same manner and through the same path as prior to the input pulse, or in other words, at $T_0$. This again produces a magnetic field in the 0° direction, and the rotor 75 which is already moving under its own inertia in the clockwise direction from the 225° position is rapidly brought to the 0° position where it is locked in place and terminates its rotation.

The rotor will remain in the 0° position until the next pulse appears on either line 11 or line 10. If the next pulse appears on line 11, the apparatus will repeat the same sequence as described above.

If a pulse appears on conductor 10, the same sequence of events will occur only in the counterclockwise direction, first moving to the 315° position under the influence of the fields of winding 40 and the right half of winding 14, then to the 270° position after the field of winding 40 collapses at $T_5$. The rotor continues to the 180° position, thence to the 135° position at time $T_{16}$, and to the 0° position at $T_{24}$.

It may therefore be seen that the dual directional control of a stepping motor may be effected by the circuitry of this invention incorporating only two relays, each having a reversing switch and an additional single pole switch, a pair of isolating diodes and a local power source. The small number of components involved and the fact that only one relay operates for each complete cycle of the motor in one direction insures the long life of the system. The response of the system may be readily controlled by the proper choice of pull-in and drop-out times for the relays as a function of the pulse length and the motor characteristics. The only requirement of the operating pulses as compared with the motor characteristics is that each pulse lasts for a period of time sufficient for the rotor to move from a stop position at 0° to the 180° position. This, of course, is a function of the inertia of the rotor and the magnitude of the fields producing its rotation. The pull-in and drop-out time of the relay may be a function of its mechanical and electrical design or may be modified by the addition of a delay network. With either mode of controlling the operating time of the relays, a simple, effective system for controlling stepping motor is achieved.

The embodiment shown in the drawing employs electromagnetic relays and contact switches because of the simplicity, low cost and availability. Where other factors such as size, weight and power consumption prevail, the same concepts here disclosed may be incorporated in control circuits employing solid state or other types of elements.

Although for the purpose of explaining the invention a particular embodiment thereof has been shown and described, obvious modifications will occur to a person skilled in the art, and I do not desire to be limited to the exact details shown and described.

I claim:

1. A control circuit for a motor having two stator windings producing fields at right angles to each other and a rotor that aligns itself with the resultant field of said two windings, said control circuit comprising: a local direct current source; a source of control pulses of substantial duration; normally de-energized relay means that is slow to operate and slow to release and having contacts connecting said local source to one of said stator windings in one polarity when de-energized and in the opposite polarity when energized and having contacts connecting said local source to said other stator winding only when energized; means connecting said source of control pulses to said relay and to the other stator winding in polarity-opposing relation to said connection of said local source thereto when said relay is energized, whereby said resultant field is normally that of said one stator winding alone in a reference direction, is of both windings and advanced 45° in response to a control pulse prior to operation of said relay by said control pulse, is of said other winding alone and advanced 90° in response to partial operation of said relay, is of said one winding alone in reversed polarity and advanced 180° in response to full operation of said relay, is of both windings in reversed polarity and advanced 225° in response to cessation of said control pulse, and is of said one winding and advanced 360° in response to release of said relay.

2. A control circuit for energizing from a source of pulses a stepper motor having a first stator winding, a second stator winding for developing a field at right-angles with respect to the field developed by the first stator winding, and a rotor responsive to the combined fields of the stator windings comprising: means for normally applying a unidirectional current to the first stator winding to align the rotor in a preselected 0° position; means for applying pulses from the source to the second stator winding to shift the resultant stator field from the 0° to a position intermediate the 0° and 90° positions; means activated by pulses from the source for sequentially, first, interrupting the flow of current in the first stator winding to shift the resultant stator field to a substantially 90° position, and second, reversing the direction of flow in the first stator winding and introducing current into the second winding producing a field opposing the field produced in the second stator winding by the flow of current from the pulse source to shift the resultant stator field to substantially the 180° position; the control circuit being responsive to the termination of a pulse from the source and the cessation of flow of current from the source through the second stator winding to shift the resultant stator field to a position intermediate the 180° position and the 270° position, the said activated means being responsive to the cessation of a pulse to terminate the flow of current through the second stator winding and to reinstitute the flow of current through the first stator winding, to shift the resultant stator field to the preselected 0° position whereby the rotor moves under the influence of the shifting resultant field through one revolution.

3. A control circuit for energizing from a source of pulses a stepper motor having a first stator winding for producing a field in one direction, a second stator winding for producing a field at right-angle to the field developed by the first stator winding, and a rotor responsive to the combined fields of the stator windings comprising: means for normally applying a unidirectional current to the first stator winding to align the rotor in a preselected 0° position; means for applying pulses from the source of a first section of the second stator winding to shift the resultant stator field to a position intermediate the 0° and 90° positions; means activated by pulses from the source for sequentially, first, interrupting the flow of current in the first stator winding to shift the resultant stator field to substantially the 90° position, and second, reversing the direction of flow of current in the first stator winding and introducing current in a second section of the second winding to produce a field in opposition to the field produced by the first section of the second stator winding to shift the resultant stator field to substantially the 180° position, the control circuit being responsive to the termination of a pulse from the source and the cessation of flow of current from the source through the second stator winding to shift the resultant stator field to a position intermediate the 180° position and the 270° position, the said activated means being responsive to the cessation of a pulse to terminate the flow of current through the second stator winding and to reinstitute the flow of current through the first stator winding to shift the resultant stator field to the 0° position whereby the rotor moves under the influence of the shifting resultant stator field through one revolution.

4. A control circuit for energizing from a source of pulses a stepper motor having a first stator winding for producing a field in one direction, a second stator winding for producing a field at right-angle to the field developed by the first stator winding, and a rotor responsive to the combined fields of the stator windings comprising: means for normally applying a unidirectional current to the first stator winding to align the rotor in a preselected 0° position; means applying a pulse from the source to the second stator winding to shift the resultant stator field to a position intermediate to the 0° and the 90° positions; single relay means activated by the pulse from the source for sequentially, first, interrupting the flow of current in the first stator winding to shift the resultant stator field to a substantially 90° position, reversing the direction of current flow in the first stator winding and introducing current in the second stator winding to produce a field substantially equal and in opposition to the field produced by current from the pulse source to shift the resultant stator field to a substantially 180° position; the control circuit being responsive to the termination of the pulse and the collapse of the field produced by the pulse in the first stator winding to shift the resultant stator field to a position intermediate the 180° and 270° positions; the single relay means being responsive to the termination of the pulse to terminate the flow of current through the second stator winding and to reverse the direction of current flow through the first stator winding to shift the resultant stator field to the 0° position, whereby the rotor moves under the influence of the shifting resultant stator field through one revolution.

5. The combination in accordance with claim 4 including a second source of pulses; means applying pulses from the second source to the second stator winding to produce an opposite field from the field produced by current flow from the first source to shift the resultant stator field to a position between the 0° and the 270° position; second relay means responsive to pulses from the second source for sequentially, first, interrupting the flow of current in the first stator winding to shift the resultant stator field to substantially the 270° position, and second, reversing the direction of current flow in the first stator winding and introducing current in the second stator winding producing a field in opposition to the field produced by current from the second pulse source to shift the resultant stator field to substantially the 180° position; the control circuit being responsive to the termination of a pulse from the second source and the collapse of the magnetic field in the second stator winding produced thereby to shift the resultant stator field to a position intermediate to the 180° and the 90° positions; the second relay means being responsive to the termination of the pulse from the second pulse source for interrupting the flow of current through the second stator winding and for reversing the flow of current through the first stator winding to shift the resultant stator field to the 0° position, whereby the rotor moves under the influence of the shifting resultant stator field through one revolution.

6. A control circuit for energizing from a source of pulses a stepper motor having a first stator winding for producing a field in one direction, a second stator winding for producing a field at right-angle to the field developed by the first stator winding, and a rotor responsive to the combined fields of the stator windings comprising: means for normally applying a unidirectional current to the first stator winding to align the rotor in a preselected normal 0° position; means applying pulses from the source to the second stator winding to shift the resultant stator field to a position intermediate the 0° and the 90° positions; a pulse-actuated reversing switch connected between the source of unidirectional current and the first stator winding for sequentially, first, interrupting the flow of unidirectional current through the first winding and, second, reversing the direction of unidirectional current flow through the first stator winding; and second switch means responsive to pulses from the source for applying unidirectional current to the second stator winding to produce a field in opposition to the field produced by pulses from the source.

7. The combination in accordance with claim 6 wherein the reversing switch and second switch means include means for slowing the operation and release thereof, whereupon changes in the magnetic field produced by the second stator winding occur subsequent to the change in magnetic field in the first stator winding due to the presence or absence of a pulse from the source.

8. A control circuit for energizing from a source of pulses a stepper motor having a first stator winding for producing a field in one direction, a second stator winding for producing a field at right-angle to the field developed by the first stator winding, and a rotor responsive to the combined fields of the stator windings comprising: means including a pair of series-connected reversing switches for normally applying a unidirectional current to the first stator winding; a pair of input conductors connected to opposite sides of the second stator winding, the second stator winding being responsive to pulses on the input conductors of one mode for establishing a magnetic field in one direction and being responsive to input pulses in a different mode for establishing a magnetic field in the opposite direction; and switch means responsive ot input signals on the input leads for temporarily neutralizing the magnetic field produced in the second stator winding.

9. The combination in accordance with claim 8 wherein the switch means comprises a pair of individual switches each responsive to input signals of a different mode and connected to a respective input conductor.

10. The combination in accordance with claim 8 wherein the second stator winding includes a center tap and input signals of one mode are applied between one input conductor and the center tap, and input pulses of the different mode are applied between the other input conductor and the center tap.

11. The combination in accordance with claim 8 wherein the two individual switch means responsive to input pulses of different modes are connected to respective opposite input conductors to produce a current flow in the presence of an input pulse through the second stator winding section to the center tap in the opposite direction to the current produced by the input pulse.

No references cited.